(12) United States Patent
Hooker et al.

(10) Patent No.: US 12,466,277 B2
(45) Date of Patent: Nov. 11, 2025

(54) ELECTRIC VEHICLE SUPPLY EQUIPMENT (EVSE) POWERED APPARATUS

(71) Applicant: Midea Group Co., Ltd., Foshan (CN)

(72) Inventors: John Kenneth Hooker, Louisville, KY (US); Justin Paul William Varga, Pewee Valley, KY (US)

(73) Assignee: MIDEA GROUP CO., LTD., Guangdong (CN)

(*) Notice: Subject to any disclaimer, the term of this patent is extended or adjusted under 35 U.S.C. 154(b) by 597 days.

(21) Appl. No.: 17/854,855

(22) Filed: Jun. 30, 2022

(65) Prior Publication Data
US 2024/0001779 A1    Jan. 4, 2024

(51) Int. Cl.
*B60L 53/16* (2019.01)
*H02J 3/14* (2006.01)
*H02J 7/00* (2006.01)

(52) U.S. Cl.
CPC ............ *B60L 53/16* (2019.02); *H02J 3/14* (2013.01); *H02J 7/0042* (2013.01); *H02J 2310/58* (2020.01)

(58) Field of Classification Search
CPC ............ B60L 53/16; H02J 3/14; H02J 7/0042
USPC ........................................... 320/104
See application file for complete search history.

(56) References Cited

U.S. PATENT DOCUMENTS

| | | |
|---|---|---|
| 6,188,208 B1 | 2/2001 | Glaser et al. |
| 6,246,034 B1 | 6/2001 | Glaser et al. |
| 6,849,834 B2 | 2/2005 | Smolenski et al. |
| 7,397,225 B2 | 7/2008 | Schulz |
| 8,981,716 B2 | 3/2015 | Bianco |
| 9,075,098 B2 | 7/2015 | Schurman et al. |
| 9,197,949 B2 | 11/2015 | Indovina et al. |
| 9,270,115 B2 | 2/2016 | Bosen et al. |
| 9,466,999 B2 | 10/2016 | Ishii et al. |

(Continued)

FOREIGN PATENT DOCUMENTS

DE    202021002165 U1    8/2021

OTHER PUBLICATIONS

Joo, Won Moon; Vehicles and OCPP Backends; Retrieved from https://www.ampcontrol.io/post/how-to-use-demand-response-with-electric-vehicles-and-ocpp-backends; dated Feb. 8, 2022.

(Continued)

*Primary Examiner* — Jack Chiang
*Assistant Examiner* — Suchin Parihar
(74) *Attorney, Agent, or Firm* — Gray Ice Higdon

(57) ABSTRACT

An Electric Vehicle Supply Equipment (EVSE) powered apparatus includes an input power receptacle capable of receiving the plug of an EVSE device to power the apparatus using power supplied by the EVSE device, and a user-actuatable control that may be used to transition the EVSE device from a connected but not charging state to a charging state after the plug has been inserted into the input power receptacle to cause the EVSE device to transition to the charging state and supply power through the plug. In some instances, one or more output power receptacles may be provided to enable various external electrically-powered devices to be plugged into the apparatus and powered by the EVSE device, while in other instances, the apparatus itself may be an appliance, tool, or other high power device, such that the apparatus is powered directly from the EVSE device.

22 Claims, 4 Drawing Sheets

(56) References Cited

U.S. PATENT DOCUMENTS

| | | | |
|---|---|---|---|
| 9,511,676 | B2 | 12/2016 | Loftus et al. |
| 9,608,533 | B2 | 3/2017 | Ostrovsky |
| 9,630,513 | B2 * | 4/2017 | Fietzek ............... B60L 55/00 |
| 10,183,586 | B1 | 1/2019 | Appelbaum |
| 11,142,072 | B2 | 10/2021 | Bhat et al. |
| 11,223,201 | B1 | 1/2022 | Bailey et al. |
| 11,990,751 | B1 * | 5/2024 | Zwilling ............... H02J 3/144 |
| 2003/0225483 | A1 | 12/2003 | Santinato et al. |
| 2010/0017045 | A1 | 1/2010 | Nesler et al. |
| 2014/0214229 | A1 | 7/2014 | Burke et al. |
| 2017/0197517 | A1 * | 7/2017 | Jamieson ............. B60L 53/14 |
| 2020/0122585 | A1 | 4/2020 | Bhat |
| 2021/0376634 | A1 | 12/2021 | Smith et al. |
| 2023/0029830 | A1 * | 2/2023 | Gottlieb ............... H02M 1/007 |
| 2023/0063349 | A1 * | 3/2023 | Bertness ............. B60L 53/14 |
| 2023/0082551 | A1 * | 3/2023 | Hu ....................... B60L 53/63 |
| | | | 174/50 |
| 2024/0190281 | A1 * | 6/2024 | Hooker ................ B60L 53/62 |

OTHER PUBLICATIONS

Villarreal, Bethany; Load Management and Demand Response: Why Utilities Demand Smart EV Charging Stations; Retrieved from https://www.semaconnect.com/resources/blog/load-management-and-demand-response/; dated Apr. 24, 2020.

Trabish, Herman K; EV Charging Promises a Demand Response Bonanza for Utilities, If They Can Handle It; Retrieved from https://www.utilitydive.com/news/ev-charging-promises-a-demand-response-bonanza-for-utilities-if-they-can-h/563453/; dated Oct. 18, 2019.

Demand Response, Earn Payments for Reducing Energy Consumption Through Demand Response; Video retrieved from https://www.enelx.com/n-a/en/businesses/distributed-energy/demand-response.

EV Connect; Why EV Charging Demand Response is Critical During the Summer; EV Connect; Retrieved from https://www.evconnect.com/blog/ev-demand-response-in-the-summer; dated Jul. 18.

Meyers, Jeff; "Electric Vehicles & Demand Response: How Utilities Are Beginning to Prepare Special Electric Vehicle Selection"; EE Online Article Published Part of the Nov./Dec. 2010 EE Magazine; dated 2010.

Related Applications Transmittal filed Dec. 29, 2022.

EVSE Adapters, EV Charger Power Converter, Retrieved from: https://www.evseadapters.com/products/j1772-ev-charger-power-converter/; 2021, Retrieved on: Feb. 22, 2022.

EVSE Adapters, J1772 to Nema 6-50 Adapter, Retrieved from: https://www.evseadapters.com/products/j1772-to-nema-6-50-adapter/, 2021, Retrieved on: Feb. 22, 2022.

EVSE Adapters, J1772 to Nema 5-15/5-20 EV Charger Adapter for E-Bike/Scooter/One wheel, etc., Retrieved from: https://www.evseadapters.com/products/j1772-ev-adapter-for-ebike/, 2021, Retrieved on: Feb. 22, 2022.

EVSE Adapters, Tesla to Nema 5-15 EV Charger Adapter for E-Bike/Scooter/One wheel, etc., Retrieved from: https://www.evseadapters.com/products/tesla-to-nema-5-15-ev-charger-adapter-for-e-bike-scooter-one-wheel-etc/, 2021, Retrieved on: Feb. 22, 2022.

Splitvolt, Splitvolt Nema 10-30/14-50 Splitter Switch (TM) 10-30 Plug to 10-30 Outlet (A) & 14-50 Outlet (B)—Automatic Power Switching for Dryer and EV, Internal Safety Breaker, Real-time Display, 24 Amp, 240V, Retrieved from: https://www.amazon.com/Splitvolt-Splitter-Automatic-Switching-Between/dp/B08PDRTX5X/ref=sr_1_5?crid=1JB2CNA1OOT4S&keywords=splitvolt%2Bnema%2B10-30%2F14-50%2Bsplitter%2Bswitch%2B10-30%2Bplug%2Bevse&qid=1656608944&sprefix=splitvolt%2Bnema%2B10-30%2F14-50%2Bsplitter%2Bswitch%2B10-30%2Bplug%2Bevse%2Caps%2C88&sr=8-5&th=1. Retrieved on Jun. 30, 2022.

Parkworld, Parkworld 61506 4-Prong RV Splitter, Nema 14-50P Male Plug to 14-50R & 6-20R (T-Blade Also for 6-15R) Female Receptacle (3 Feet), Retrieved from: https://www.amazon.com/Parkworld-61506-4-Prong-Splitter-Receptacle/dp/B081YWXMFY/ref=sr_1_1?crid=2MV2ZNN0J4GQ5&keywords=parkworld+61506+4-prong+rv+splitter+nema+14-50&qid=1656609236&sprefix=parkworld+61506+4-prong+rv+splitter+nema+14-50%2Caps%2C62&sr=8-1, Retrieved on Jun. 30, 2022.

Ly, Xuan, United States Patent and Trademark Office, Non-Final Office Action issued in U.S. Appl. No. 18/078,920, 73 pages, dated Oct. 1, 2025.

\* cited by examiner

ELECTRIC VEHICLE SUPPLY EQUIPMENT (EVSE) POWERED APPARATUS

BACKGROUND

As the world transitions away from fossil fuel powered vehicles to electric vehicles, the need has arisen for providing owners of electric vehicles (EVs) with convenient and fast charging of their vehicles wherever they may be. However, despite the fact that the number of publicly-accessible charging stations, also referred to as Electric Vehicle Supply Equipment (EVSE) devices continues to grow, it is expected that many vehicle owners will primarily charge their vehicles at home, e.g., in a garage or carport where they park their vehicles while at home.

Moreover, while it is possible to charge electric vehicles from the standard wall outlets found in many homes, which in the United States operate at 120 VAC, charging from such wall outlets (generally using what are generally referred to as Level 1 chargers) can be exceptionally slow, and as a result, many vehicle owners prefer to install higher output, Level 2 EVSE devices in their homes in order to accelerate the charging process. Level 2 EVSE devices generally must be supplied with 208-240 VAC power, and as many garages and carports where vehicles are stored were not originally provided with 208-40 VAC service, many vehicle owners are required to have an electrician come and install an appropriate 208-240 VAC electrical circuit whenever a Level 2 EVSE device is installed at their home.

Many Level 2 EVSE devices are hard-wired, rather than being plugged into a socket or receptacle, so despite the fact that an EVSE device may not be actively charging a vehicle a good portion of the time, the 208-240 VAC electric circuit to which it is coupled is generally not available for any other use. There are, however, a wide variety of tools, appliances and other high power devices that use such an electrical circuit, and many are well suited for use in a garage or otherwise outside the main structure of a home, including, for example, heaters such as garage heaters, air conditioners, vacuums such as whole house or shop vac systems, tools such as table saws and other woodworking equipment, arc welders, etc. When a Level 2 EVSE device is hard-wired to its electrical circuit, however, these other high power devices are only usable if a different electrical circuit, typically with a suitable socket or receptacle, is provided in the area. Installing additional electrical circuits, however, can be expensive, and in some instances, may exceed the capacity of the existing electrical panels in the home, requiring even more expensive upgrades to the home's existing infrastructure.

SUMMARY

The invention addresses these and other problems associated with the art by providing an apparatus and method of using the same that includes an input power receptacle that is capable of receiving the plug of an Electric Vehicle Supply Equipment (EVSE) device to power the apparatus using power supplied by the EVSE device. Moreover, the apparatus includes a user-actuatable control that may be used to transition the EVSE device from a connected but not charging state to a charging state after the plug has been inserted into the input power receptacle to cause the EVSE device to transition to the charging state and begin to supply power through the plug, and thus to the apparatus. In some instances, the apparatus may also include one or more output power receptacles that enable various external electrically-powered devices to be plugged into the apparatus and powered by the EVSE device, while in other instances, the apparatus itself may be an appliance, tool, or other high power device, such that the apparatus is powered directly from the EVSE device.

Therefore, consistent with one aspect of the invention, an apparatus configured to receive power from an Electric Vehicle Supply Equipment (EVSE) device that operates in at least disconnected, connected but not charging, and charging states and that includes a plug that is configured to supply power to an electric vehicle when the EVSE device is in the charging state may include a housing, an input power receptacle disposed on the housing and configured to receive the plug of the EVSE device to establish a physical connection therebetween when the EVSE device is in the disconnected state, the input power receptacle including one or more line power inputs configured to interface with one or more corresponding line power outputs of the plug of the EVSE device, a control circuit coupled to the input power receptacle and configured to, upon establishment of the physical connection between the plug and the input power receptacle, automatically cause the EVSE device to transition from the disconnected state to the connected but not charging state, and a user-actuatable control coupled to the control circuit. In addition, the control circuit may further be configured to, in response to user actuation of the user-actuatable control when the physical connection between the plug and the input power receptacle is established and the EVSE device is in the connected but not charging state, cause the EVSE device to transition from the connected but not charging state to the charging state and thereby supply power to the one or more line power inputs of the input power receptacle through the plug.

Some embodiments may also include one or more power output receptacles coupled to the one or more line power inputs of the input power receptacle, each of the one or more output power receptacles configured to receive a plug from an external electrically-powered device such that when the EVSE device is in the charging state and the physical connection is established between the plug and the input power receptacle, the power supplied to the one or more line power inputs of the input power receptacle through the plug powers the one or more output power receptacles. Also, in some embodiments, the one or more output power receptacles includes a plurality of output power receptacles capable of simultaneously powering a plurality of external electrically-powered devices having respective plugs coupled to the plurality of output power receptacles. Further, in some embodiments, the plurality of output power receptacles differ from one another such that each of the plurality of output power receptacles receives a different type of plug. In some embodiments, the plurality of output power receptacles includes a 15 Amp National Electrical Manufacturers Association (NEMA) compatible receptacle, a 20 Amp NEMA compatible receptacle, a 30 Amp NEMA compatible receptacle, and a 50 Amp NEMA compatible receptacle.

In addition, some embodiments may also include one or more electrical loads disposed in the housing and coupled to the one or more line power inputs of the input power receptacle such that when the EVSE device is in the charging state and the physical connection is established between the plug and the input power receptacle, the power supplied to the one or more line power inputs of the input power receptacle through the plug powers the one or more electrical loads. In some embodiments, the one or more electrical loads includes an electric motor and/or a heating element. In addition, in some embodiments, the apparatus is an appliance or a tool. Moreover, in some embodiments, the apparatus is a vacuum, a power tool, a heater, or an air conditioner.

In some embodiments, the input power receptacle is a Society of Automotive Engineers (SAE) J1772 compatible receptacle. Moreover, in some embodiments, the input power receptacle includes a control input configured to interface with a corresponding control output of the plug, the control circuit causes the EVSE device to transition from the disconnected state to the connected but not charging state by reducing a voltage at the control output of the plug below a first threshold, and the control circuit causes the EVSE device to transition from the connected but not charging state to the charging state by reducing the voltage at the control output of the plug below a second threshold that is lower than the first threshold. In some embodiments, the control circuit includes first and second resistors coupled to the control input of the input power receptacle, the first resistor configured to electrically couple the control output of the plug to ground through the first resistor when the physical connection between the plug and the input power receptacle is established, and the second resistor configured to electrically couple the control output of the plug to ground through the second resistor when the user-actuatable control is actuated.

In addition, in some embodiments, the control circuit includes a controller and a power supply that powers the controller, and the power supply is coupled to the one or more line power inputs of the input power receptacle such that the power supply and controller are unpowered until the physical connection between the plug and the input power receptacle is established and the EVSE device is transitioned from the connected but not charging state to the charging state in response to the user actuation of the user-actuatable control. In some embodiments, the user-actuatable control is a first user-actuatable control, and the apparatus further includes one or more line power outputs configured to power one or more electrical loads, one or more relays, each configured to selectively couple a respective line power input of the one or more line power inputs and to a respective line power output of the one or more line power outputs in response to a respective relay control signal, and a second user-actuatable control coupled to the control circuit, and the control circuit is configured to drive the respective relay control signal of each of the one or more relays to selectively couple together the respective line power input and line power output of each of the one or more relays and thereby selectively power the one or more electrical loads. Moreover, in some embodiments, the first and second user-actuatable controls are physical momentary controls disposed on the housing. Also, in some embodiments, the control circuit is further configured to disable the one or more relays in response to detecting removal of the plug from the input power receptacle.

In some embodiments, the input power receptacle includes a control input configured to interface with a corresponding control output of the plug, and the control circuit is further configured to determine an allowed current for supplying power over the one or more line power outputs by sensing a control signal generated by the EVSE device and received by the control input of the input power receptacle. In addition, in some embodiments, the control circuit is configured to determine the allowed current for supplying power over the one or more line power outputs by determining a duty cycle of the control signal.

Also, in some embodiments, the control circuit is further configured to sense a load current while power is supplied over the one or more line power outputs and compare the sensed load current with the determined allowed current. Moreover, in some embodiments, the control circuit is configured to selectively generate an alert in response to the comparison of the sensed load current with the determined allowed current and/or selectively decouple the respective line power input and line power output of each of the one or more relays from one another to discontinue powering the one or more electrical loads. Further, in some embodiments, the control circuit is further configured to shut down in response to a failure to determine the allowed current for supplying power over the one or more line power outputs.

Consistent with another aspect of the invention, an apparatus configured to receive power from an Electric Vehicle Supply Equipment (EVSE) device that operates in at least disconnected, connected but not charging, and charging states and that includes a plug that is configured to supply power to an electric vehicle when the EVSE device is in the charging state may include a housing, one or more electrical loads disposed in the housing, the one or more electrical loads including one or more electric motors and/or one or more heating elements, an input power receptacle disposed on the housing and configured to receive the plug of the EVSE device to establish a physical connection therebetween when the EVSE device is in the disconnected state, the input power receptacle including one or more line power inputs configured to receive power from the plug of the EVSE device, a control circuit coupled to the input power receptacle and configured to, upon establishment of the physical connection between the plug and the input power receptacle, automatically cause the EVSE device to transition from the disconnected state to the connected but not charging state, and a user-actuatable control coupled to the control circuit. In addition, the control circuit may further be configured to, in response to user actuation of the user-actuatable control when the physical connection between the plug and the input power receptacle is established and the EVSE device is in the connected but not charging state, cause the EVSE device to transition from the connected but not charging state to the charging state and thereby supply power to the one or more line power inputs of the input power receptacle through the plug.

Other embodiments may include various methods of using the various structures as described above.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
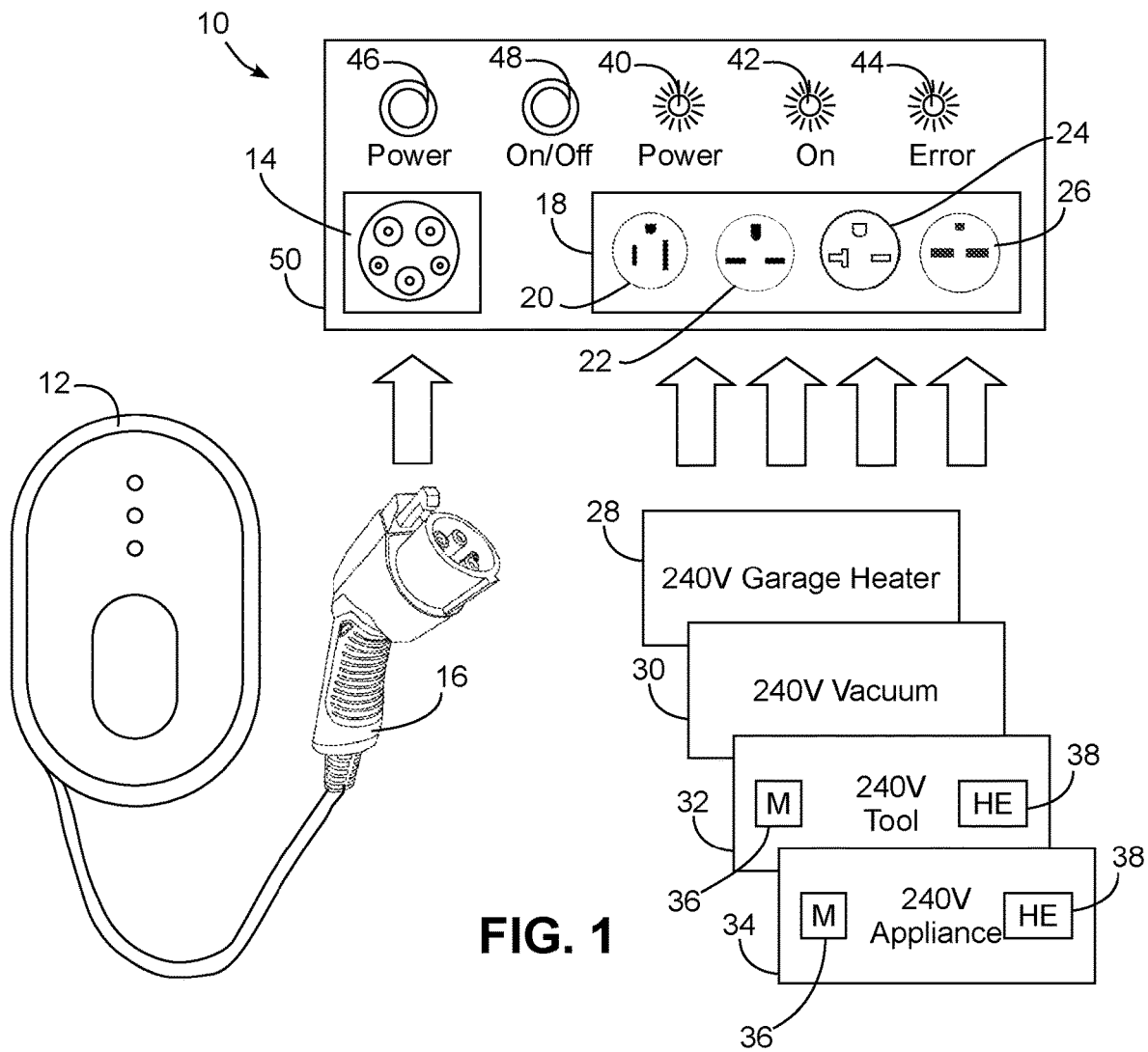
FIG. 1 is a perspective view of an example embodiment of an EVSE powered apparatus consistent with some embodiments of the invention, and including multiple output power receptacles for powering various types of external electrically-powered devices.

Now turning to the drawings, where like numbers denote like parts throughout the several views, FIG. 1 illustrates an example EVSE powered apparatus 10 consistent with some embodiments of the invention. EVSE powered apparatus 10 is configured to be powered by an EVSE device 12, and includes an input power receptacle 14 or socket (hereinafter referred to as a receptacle) that is configured to receive a plug or other physical device 16 (hereinafter referred to as a plug) of EVSE device 12 and through which power is supplied to EVSE powered apparatus 10.

EVSE device 12, in this regard, may be implemented using any type of device that is generally use to supply electrical power to an electric vehicle in order charge the batteries of the electric vehicle, and may include various devices also referred to as chargers, charging stations or the like. Plug 16 is generally configured to be received by a receptacle disposed on an electric vehicle to establish a physical connection between the plug and receptacle and allow for the flow of electrical energy therebetween.

In the illustrated embodiments, EVSE device 12 is a Level 2 EVSE device that operates using 208-240 VAC, and both receptacle 14 and plug 16 are compatible with the Society of Automotive Engineers (SAE) J1772 standard. However, it will be appreciated by those of ordinary skill having the benefit of the instant disclosure that an EVSE device used in other embodiments may be compliant with different standards, and may have different power outputs or levels, so the invention is not limited to the particular EVSE device for which the illustrated embodiments are specifically configured. Furthermore, it will be appreciated that receptacle 14, and the control circuitry utilized in EVSE powered apparatus 10, may vary based upon the specific type of EVSE device with which the EVSE powered apparatus 10 is configured to operate.

In the embodiment of FIG. 1, EVSE powered apparatus 10 is configured to power one or more external electrically-powered devices, and as such, is configured as a type of power strip or power center including a panel 18 with an arrangement of output power receptacles 20, 22, 24 and 26 into which the plugs of various types of electrically-powered devices, e.g., devices 28, 30, 32 and 34, may be inserted in order to receive power from EVSE powered apparatus 10. Output power receptacles 20-26 in the illustrated embodiment are National Electrical Manufacturers Association (NEMA) compatible receptacles. Output power receptacle 20, for example, is a NEMA 50 Amp output power receptacle such as a NEMA 6-50 output power receptacle, and output power receptacle 22 is a NEMA 30 Amp output power receptacle such as a NEMA 6-30 output power receptacle. Output power receptacle 24 is a NEMA 20 Amp output power receptacle such as a NEMA 6-20 output power receptacle, and output power receptacle 26 is a NEMA 15 Amp output power receptacle such as a NEMA 6-15 output power receptacle. It will be appreciated, however, that different numbers of output power receptacles (including as few as one) may be used in various embodiments, as well as multiple output power receptacles of the same type, or other types that are used in other geographical regions. Thus, the four output power receptacles illustrated in FIG. 1 are merely illustrative examples of the types of output power receptacles that may be used. In addition, it will be appreciated that in the illustrated configuration, all four output power receptacles are simultaneously active and thus capable of simultaneously powering multiple external electrically-powered devices.

External electrically-powered devices 28-34 may include practically any electrically-powered device capable of being powered by EVSE powered apparatus 10, generally any electrically-powered device including a suitable plug (or plug and suitable adapter) for forming a physical connection with one of output power receptacles 20-26, and having electrical power requirements that are compatible with the electrical power output by EVSE powered apparatus 10 (e.g., U.S. Standard 208-240 VAC 60 Hz single phase power in the illustrated embodiment).

External electrically-powered device 28, for example, is a 240V heater (which, in some instances, could be operated derated at 208V), e.g., a garage heater, and external electrically-powered device 30 is a 240V vacuum, e.g., a whole house or shop vacuum system. However, as represented by external electrically-powered devices 32 and 34, any number of tools 32, appliances 34 or other electrically-powered devices may be used, and that such devices generally include one or more high power electrical loads (e.g., one or more electric motors 36 and/or one or more heating elements 38) that have combined power requirements that generally exceed the capabilities of U.S. Standard 110-120 VAC service. Examples of other suitable devices include, but are not limited to, various other types of power tools (e.g., shop tools, arc welders, table saws, woodworking equipment, etc.), appliances, heaters, air conditioners, etc.

EVSE powered apparatus 10 may also include a user interface including one or more lights or indicators, e.g., a power indicator 40, an on indicator 42 and an error indicator 44, as well as one or more user-actuatable controls, e.g., a power user-actuatable control 46 and an on/off user-actuatable control 48. In the illustrated embodiment, user-actuatable controls 46, 48 are implemented as physical, momentary buttons or switches, although it will be appreciated that a wide variety of alternate controls may be used, including other types of buttons, switches, touch sensitive surfaces, knobs, levers, rockers, keys, etc. Likewise, information may be conveyed to a user in other manners than indicators 40-44, e.g., using different lights, or using speakers, haptic actuators, display screens, etc. In some embodiments, for example, an alphanumeric display may be used, or alternatively, a touch screen may be used, to handle one or both of user input and output.

EVSE powered apparatus 10 also includes a housing 50 configured to house components 14, 18-26 and 40-48, and it will be appreciated that housing 50 may be constructed of various materials and have various shapes and sizes as may be appropriate for different applications. EVSE powered apparatus 10 may also be wall-mountable in some applications.

Figure 2:
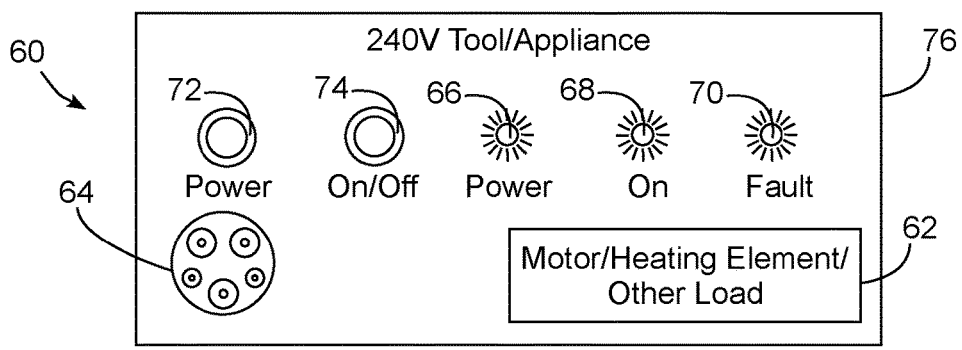
FIG. 2 is a perspective view of another example embodiment of an EVSE powered apparatus consistent with the invention, and configured as an electrically-powered device.

Now turning to FIG. 2, this figure illustrates another EVSE powered apparatus 60, which rather than providing output power receptacles for powering one or more external electrically-powered devices as is the case for EVSE powered apparatus 10, is itself an electrically-powered device including one or more electrical loads 62, e.g., one or more electric motors, one or more heating elements and/or one or more other type of electrical load. Similar to EVSE powered apparatus 10, EVSE powered apparatus 60 includes an input power receptacle 64, one or more lights or indicators 66, 68, 70 and one or more user-actuatable controls 72, 74, all disposed within a housing 76. Unlike EVSE powered apparatus 10, however, EVSE powered apparatus 60 is effectively integrated with the functions of an appliance, tool or whatever electrically-powered device with which the EVSE powered functionality disclosed herein is integrated. Thus, for example, it will be appreciated that the user interface and/or housing may be implemented in innumerable different ways that are specific to the particular type of electrically-powered device being implemented. The user interface, in particular, may be implemented in some embodiments within the user interface of the overall device. In some instances, for example, the EVSE powered apparatus 60 may have almost the exact same appearance and function, with the exception of including an input power receptacle that is suitable for receiving the plug of an EVSE device. As but one example, a garage heater implementation of EVSE powered apparatus 60 may appear and function exactly like a conventional garage heater with the exception of including an SAE J1772 compatible input power receptacle, and in some instances, a user-actuatable control used to trigger a state transition in the EVSE device, as will be discussed in greater detail below.

Specifically, many EVSE devices are configured to utilize a handshake procedure with an electric vehicle once a physical connection is established between the EVSE plug and the receptacle on the electric vehicle. The SAE J1772 standard, for example, utilizes two line power connections referred to as L1 and L2, two control connections referred to as control pilot (CP) and proximity pilot (PP), and a ground connection referred to as protective earth (PE). For the purposes of this disclosure, a connection may refer to the establishment of an electrical interface between corresponding connectors, pins, wires, inputs, outputs, etc. of a plug and receptacle, such that power and/or information may be communicated over the connection. In addition, at least for the L1 and L2 connections, the plug may be considered to include L1 and L2 line power outputs, while the input power receptacle may be considered to include L1 and L2 line power inputs. In addition, due to the bidirectional nature of the CP and PP signals, each of the plug and receptacle may be considered to include CP and PP inputs and/or outputs, depending on the context.

The CP connection may be used to switch the EVSE device between at least three different states, referred to herein as disconnected, connected but not charging, and charging states, which under the SAE J1772 standard, are labeled A, B and C respectively. In the disconnected state, the EVSE device does not detect the presence of an electric vehicle, i.e., no physical connection has been established between the plug of the EVSE device and a receptacle of an electric vehicle. In this state the line power connections L1 and L2 are not active, and no line power is supplied through the plug of the EVSE device. Upon detection of a physical connection, a transition occurs to the connected but not charging state, which activates a wave generator in the EVSE device to output a 1 kHz square wave signal, but maintains the L1 and L2 line power connections in the inactive state. When the electric vehicle is ready to charge, the electric vehicle may notify the EVSE device over the CP connection, causing the EVSE device to transition to a charging state, and activating the L1 and L2 line power connections. In addition, once charging has been initiated, the EVSE device is able to communicate the maximum allowed current that the electric vehicle may draw while charging by varying the duty cycle of the square wave signal. It will be appreciated, for example, that some EVSE devices support demand response, which enables a utility company, as an example, to restrict power draw of the EVSE device at certain times of the day, or even shut off the EVSE device entirely for some period of time, either to reduce power consumption during periods of high demand, or to reduce energy costs by deferring charging to the middle of the night, for example. Other EVSE devices, however, may not support demand response, so the invention is not limited to use with demand response-capable EVSE devices.

The manner in which the state transitions occur in the SAE J1772 standard is through control of the voltage of the CP signal. When in the disconnected state, for example, the CP signal has a voltage of about 12 VDC. When the plug is connected to the receptacle of a compatible electric vehicle the resistance of a voltage divider circuit coupled to the CP connection is varied, e.g., by connecting the CP connection to ground through one or more resistors disposed in the electric vehicle to drop the voltage of the CP signal to about 9 VDC, such that the EVSE device can detect the establishment of the physical connection to the electric vehicle by monitoring the voltage of the CP signal. Then, when the electric vehicle is ready to charge, the electric vehicle may connect the CP connection to ground through one or more additional resistors to drop the voltage of the CP signal further (e.g., to about 6 VDC), such that that the EVSE device can initiate the charging operation upon detecting the drop in voltage in the CP signal.

Other EVSE devices and standards may support other handshaking protocols, as well as other control signals and manners of initiating state transfers between the disconnected, connected but not charging and charging states. Therefore, the invention is not limited to the SAE J1772-specific communications discussed herein.

While it is technically possible to emulate an electric vehicle for the purposes of activating the L1 and L2 line power connections of an EVSE device, an EVSE powered apparatus as discussed herein, e.g., EVSE powered apparatus 10 or EVSE powered apparatus 60, presents a unique challenge due to the fact that, unlike an electric vehicle or other device that includes a battery or some independent source of power capable of driving a controller to oversee the emulation and cause activation of the L1 and L2 line power connections, in some embodiments an EVSE powered apparatus may have no independent source of power, creating the situation where the circuit logic that would logically be used to emulate an electric vehicle and cause the EVSE device to activate the L1 and L2 line power connections is powered by those very same L1 and L2 line power connections.

Thus, in some embodiments consistent with the invention, a user-actuatable control, e.g., the aforementioned power user-actuatable control 46 of EVSE powered apparatus 10 and power user-actuatable control 72 of EVSE powered apparatus 60 may be used to cause an EVSE device to transition from the connected but not charging state to the charging state and thereby supply power to the L1 and L2 line power connections. A user-actuatable control may, in some embodiments, be considered to refer to a type of a control that is actuated manually by a user, rather than automatically or through the use of control logic. As noted above, a wide variety of user-actuatable controls may be used in various embodiments, so the invention is not limited to the particular user-actuatable controls discussed hereinafter, specifically momentary push buttons.

Specifically, in an SAE J1772-compatible system, and as will be discussed in greater detail below, a control circuit of an EVSE powered apparatus consistent with some embodiments of the invention may cause the EVSE device to transition from the disconnected state to the connected but not charging state by reducing a voltage at the CP connection below a first threshold, and cause the EVSE device to transition from the connected but not charging state to the charging state by reducing the voltage at the control output of the plug below a second threshold that is lower than the first threshold, in part using the aforementioned user-actuatable control. Further, the manner in which the voltage reductions may occur in some embodiments using first and second resistors coupled to the CP connection, with the first resistor configured to electrically couple the CP connection to ground through the first resistor when the physical connection between the plug and the input power receptacle is established, and with the second resistor configured to electrically couple the CP connection to ground through the second resistor when the user-actuatable control is actuated. Of note, therefore, the transition from the disconnected state to the connected but not charging state is automatically performed in response to establishment of the physical connection between the plug and the input power receptacle, while the transition from the connected but not charging state to the charging state is user-initiated, i.e., in response to user input directed to a user-actuatable control.

Among other benefits, the use of a user-actuatable control is the herein-disclosed manner enables an EVSE powered apparatus such as EVSE powered apparatus 10 or EVSE powered apparatus 60 to omit any battery or alternative power source capable of driving programmable logic to interact with an EVSE device to cause the EVSE device to initiate charging. Doing so may have particular benefit when the EVSE powered apparatus is implemented as an appliance, tool, etc., since a single input power receptacle may be used to power the EVSE powered apparatus despite the fact that no usable power is effectively supplied to the EVSE powered apparatus by the EVSE device prior to (a) establishing the physical connection with the plug and the input power receptacle, and (b) actuating the user-actuatable control to cause the EVSE device to transition to the charging state. It will be appreciated, in particular, that many of the types of appliances and tools discussed herein for EVSE powered apparatus 60 do not ordinarily include batteries, and are often used and/or stored in harsh conditions, so the introduction of a separate battery could add to the cost of such devices and/or introduce additional sources of failure down the road.

Figure 3:
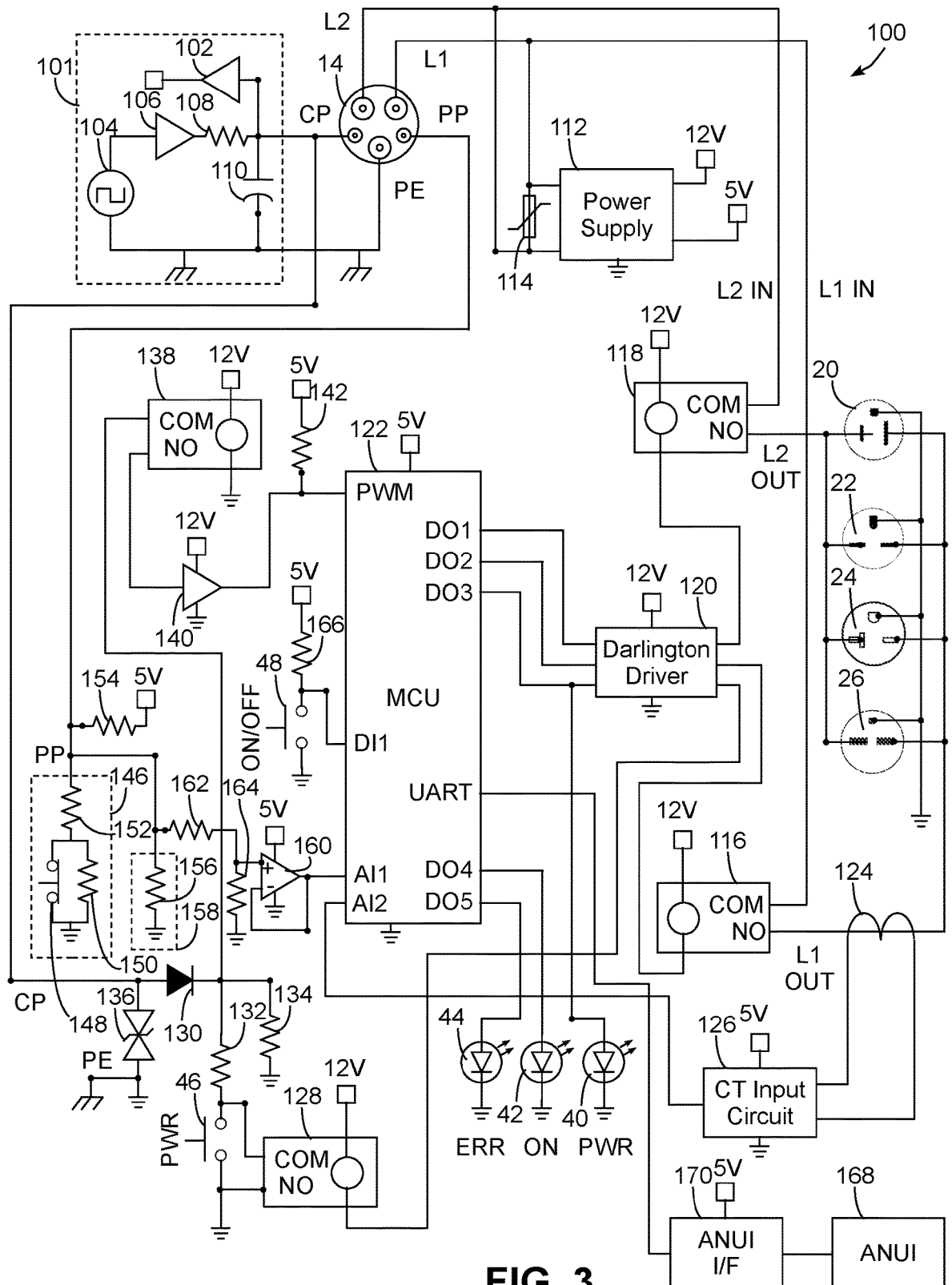
FIG. 3 is a circuit diagram of a control circuit usable in the EVSE powered apparatus of FIG. 1.

Now turning to FIG. 3, this figure illustrates a control circuit 100 that may be used in some embodiments for EVSE powered apparatus 10 of FIG. 1, along with several additional circuits incorporated into an EVSE device and delimited by dashed lines with which control circuit 100 interacts.

As an example, circuit 101 is used to generate the CP signal seen at the CP input of input power receptacle 14. A buffer 102 is used to sense the voltage of the CP signal for the purposes of state transitions, and a pilot oscillator 104 is used to generate a +/−12 VDC 1 kHz square wave signal, with a driver 106 configured to drive this signal through a resistor 108 coupled to the CP input. A small capacitor 110 is also coupled between the input to buffer 102 and resistor 108 and ground to reduce dV/dt and minimize problems such as ringing that high dV/dt may cause at the receiving end of the charging cable.

An isolated power supply 112 is coupled across input power lines L1 IN and L2 IN in parallel with a metal oxide varistor 114, and outputs 12 VDC and 5 VDC power signals for driving the control circuit. Input power lines L1 IN and L2 IN are coupled to a pair of power relays 116, 118, respectively, that selectively couple the input power lines to respective output power lines L1 OUT and L2 OUT in response to relay control signals output by a Darlington driver 120 controlled by a microcontroller 122 via outputs DO1 and DO2. Relays 116, 118 and Darlington driver 120 are coupled to the 12 VDC power supply, while microcontroller 122 is coupled to the 5 VDC power supply.

The output power receptacles 20, 22, 24, 26 are coupled in parallel across output power lines L1 OUT and L2 OUT, with the ground slots coupled to ground. For the purpose of monitoring the load current, a current transformer 124 is coupled to output power line L1 OUT and coupled to a CT input circuit 126 that couples to an analog input AI2 of microcontroller 122 and conditions the signal appropriately, e.g., by amplifying/attenuating and/or adding DC bias if needed. It will be appreciated that load current sensing may also be performed from different points of the control circuit, e.g., on the L2 OUT output power line.

A third output of Darlington driver 120 is coupled to a charging relay 128 that is coupled in parallel with power user-actuatable control 46, and is driven by a DO3 output of microcontroller 122. The CP signal is coupled to this parallel arrangement through a diode 130 and a resistor 132, and another resistor 134 is coupled between the junction of diode 130 and resistor 132 and ground. A TVS diode 136 is also coupled between the CP connection and ground.

Of note, resistor 134 is used to initiate the state transition from the disconnected state to the connected but not charging state, as when a physical connection is established, resistor 134 is introduced into the circuit to couple the CP connection to ground and lower the voltage of the CP signal accordingly, thereby enabling the sensing logic in the EVSE device to detect the physical connection.

Likewise, resistor 132, which is connected to ground in series with the parallel arrangement of user-actuated control 46 and charging relay 128, is used to initiate the state transition from the connected but not charging state to the charging state, as when either user-actuated control 46 (which may be a normally-open momentary push button) or charging relay 128 is closed, resistor 132 is introduced into the circuit to couple the CP connection to ground and further lower the voltage of the CP signal accordingly, thereby enabling the sensing logic in the EVSE device to detect the instruction to initiate charging. Of note, because user-actuated control 46 is momentary, it is desirable for microcontroller 122 to close charging relay 128 using the DO3 output once it has powered up such that the EVSE device will not revert from the charging state once the user-actuated control 46 is released. In addition, charging relay 128 provides microcontroller 122 with a programmatic option to instruct the EVSE device to discontinue charging if desired.

The junction of diode 130 and resistors 132 and 134 is also coupled to a relay 138, which is held in an activated state as long as power is supplied to power supply 112, and outputs to a comparator 140 that provides a representation of the CP signal to a PWM input of microcontroller 122, which is also coupled to the 5 VDC power supply through resistor 142.

For the PP connection, and as illustrated by circuit 146, the plug of the EVSE device includes a normally closed switch 148 that opens whenever a release actuator of the plug is pressed, and is an indicator of when a user is about to plug in or unplug a plug to or from a receptacle, and enables the EVSE device (and an electric vehicle) to perform a controlled shut off prior to the L1 and L2 connections being physically disconnected. Switch 148 is coupled to ground in parallel with resistor 150, and the parallel arrangement is coupled to the PP connection through a resistor 152.

The PP connection is also coupled to the 5 VDC power supply through a resistor 154, as well as to ground through a resistor 156 disposed in input power receptacle 14, as represented at 158. In addition, the PP connection is coupled to an analog input AI1 of microcontroller 122 through an op amp 160 to enable the microcontroller to monitor for plug disconnection, as will be discussed in greater detail below. Specifically, the PP connection is coupled to a positive input of op amp 160 through a resistor 162, and a resistor 164 couples the positive input to ground. The output of the op amp is fed back to the negative input of the op amp.

An on/off user-actuatable control 48, which may be a normally-open momentary push button, and which may be used to toggle relays 116, 118 to turn the output power receptacles 20-26 on or off, is coupled to the 5 VDC power supply by a resistor 166, and to a digital input DI1 of microcontroller 122, with activation of user-actuatable control 48 coupling the DI1 input to ground.

In addition, in some embodiments it may be desirable to utilize an alphanumeric user interface (ANUI) 168, and as such, ANUI 168 may be coupled to a UART interface of microcontroller 122 through an ANUI interface circuit 170. A graphical user interface may also be used in other embodiments, Moreover, the power, on and error indicators 40, 42 and 44 may be driven by microcontroller 122, with power indicator 40 controlled by the DO3 signal used to activate charging relay 128 to maintain the EVSE device in the charging state, and with on and error indicators 42, 44 separately driven by dedicated digital outputs DO4 and DO5 of microcontroller 122.

Figure 4:
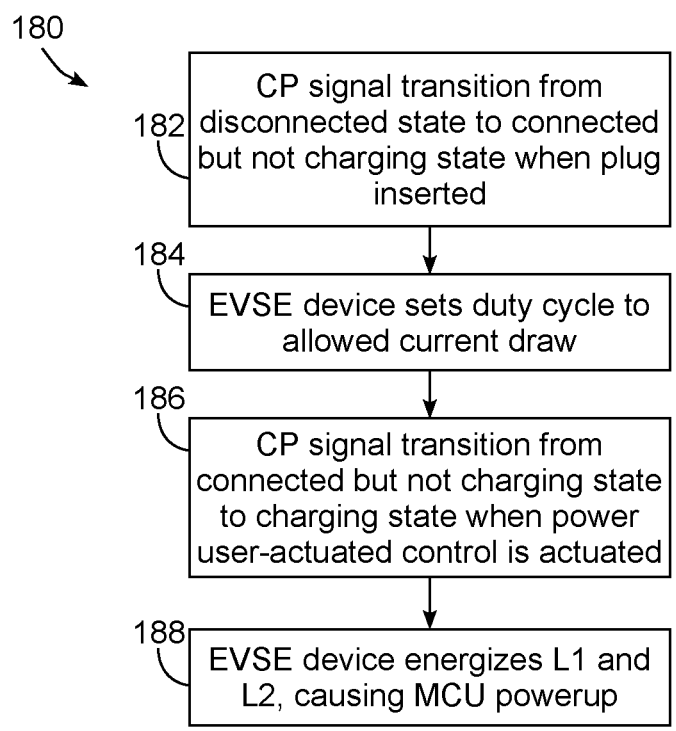
FIG. 4 is a flowchart illustrating an example sequence of operations for powering up the EVSE powered apparatus of FIG. 1.

Now turning to FIG. 4, and with continued reference to FIG. 3, in the illustrated embodiment, power supply 112 of control circuit 100 is coupled to the line power in lines L1 IN and L2 IN such that power supply 112, and thus microcontroller 122 that is powered thereby, are effectively unpowered until the physical connection between the plug and the input power receptacle is established and the EVSE device is transitioned from the connected but not charging state to the charging state in response to the user actuation of the power user-actuatable control 46.

FIG. 4, in particular, illustrates a sequence of operations 180 that occur in order to power up EVSE powered apparatus 10. Specifically, as illustrated in block 182, when the plug is inserted into the input power receptacle, the CP signal automatically transitions from the voltage corresponding to the disconnected state to the voltage corresponding to the connected but not charging state by virtue of the introduction of resistor 134 to the circuit, causing the EVSE device to transition to the connected but not charging state. Then, as illustrated in block 184, the EVSE may set the duty cycle of the CP signal to the current allowed current draw. In some embodiments, for example, the mapping of the oscillator duty cycle (d) to the allowed current draw may be AC=d*0.6 (e.g. d=10%→10*0.6=6A, d=50%→50*0.6=30A).

Next, as illustrated in block 186, when the power user-actuated control 46 is actuated by a user, the CP signal transitions from the voltage corresponding to the connected but not charging state to the voltage corresponding to the charging state by virtue of the introduction of resistor 132 to the circuit, causing the EVSE device to transition to the charging state. Then, as illustrated in block 188, the EVSE device energizes the L1 and L2 line power connections, and thus the L1 IN and L2 IN line power inputs, thereby powering power supply 112 and causing microcontroller 122 to power up.

Figure 5:
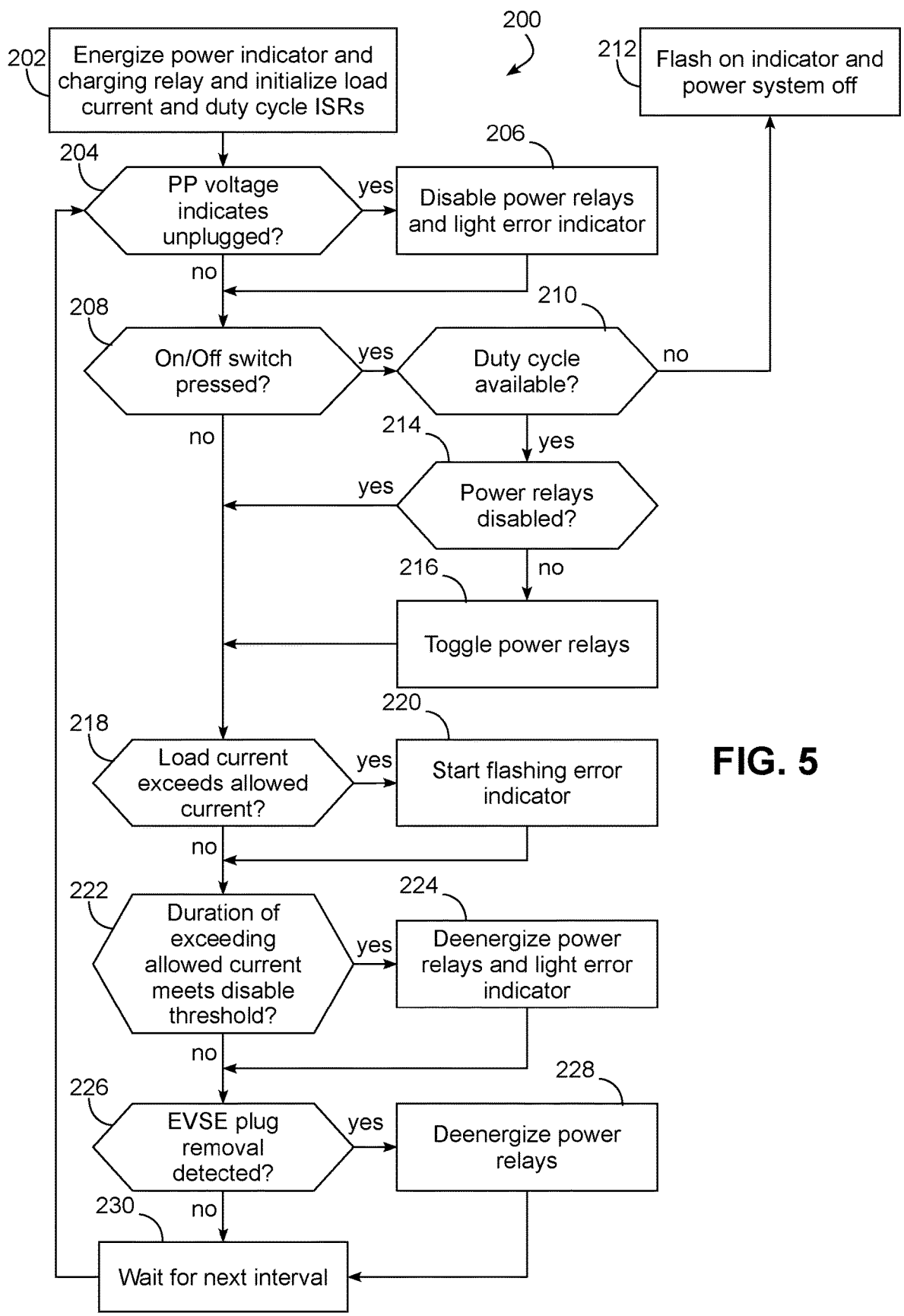
FIG. 5 is a flowchart illustrating an example sequence of operations for operating the EVSE powered apparatus of FIG. 1 subsequent to being powered up.

Now turning to FIG. 5, this figure illustrates a sequence of operations 200 that may be performed, for example, by microcontroller 122 once powered up as a result of the transition to the charging state by the EVSE device. In block 202, the power indicator 40 and charging relay 128 may be energized using the DO3 output to maintain the EVSE device in the charging state. In addition, interrupt service requests for handle sensing of the load current and tracking of the CP signal duty cycle (for determining the allowed current) are initialized, although it will be appreciated that other manners of sensing these variables may be used in other embodiments.

Next, a loop is initiated, and as illustrated in block 204 the PP signal voltage at analog input AI1 of microcontroller 122 may be sampled on an on-going basis, such that if at any time the voltage rises above an "unplugged" level, control may pass to light the error indicator 44 and disable the power relays 116, 118 in block 206.

In addition, as illustrated in block 208, a determination may be made as to whether on/off switch/user-actuatable control 48 has been pressed. In general, as long as CP signal duty cycle is in the range of allowing current draw (e.g., 10%, corresponding to a 6A draw, is generally the minimum duty cycle), then microcontroller 122 will energize digital outputs DO1, DO2 and power relays 116, 118 to pass L1, L2 voltage to power output receptacles 20-26, and simultaneously energize digital output DO4 to light on indicator 42.

Thus, if actuation of control 48 is detected, control is passed to block 210 to determine if the duty cycle of the CP signal is available. Specifically, as noted above an interrupt service request may occur at a regular sampling interval to sample the load current signal at analog input AI2 to perform an RMS measurement on the load current on an on-going basis. Further, the microcontroller uses an input capture measuring technique to continuously measure the duty cycle (d) at the PWM input, which indicates the allowed current draw as dictated by the EVSE device. Note that the allowed current draw may change over time, e.g., if the EVSE device is connected to the internet and set up to receive "load shedding" commands in order to qualify for utility rebates. If the duty cycle detection fails a consecutive number of times, pressing control 48 may instead transition the system into a "Lost (Allowed) Current" (LI) state, as illustrated in block 212. During this state, the power relays may remain unaffected, keeping them on if the current is "lost" while powering L1 and L2 and off otherwise. The on indicator 42 may also flash for a few seconds (e.g., 5) to indicate that this state has been reached before turning the system off.

Otherwise, control passes from block 210 to block 214 to determine whether the power relays are disabled, e.g., as a result of being disabled in block 206, or as a result of the duty cycle being below the minimum duty cycle for which charging is allowed. If not, control passes to block 216 to toggle power relays 116, 118 to the active position (if inactive) or to the inactive position (if active).

Next, after toggling the power relays in block 216, or if block 214 determines that the power relays are disabled or block 208 determines that the control 48 has not been pressed, control passes to block 218 to determine if the load current exceeds the allowed current. As noted above, the RMS load current may be continuously monitored at analog input AI2, and if the load current exceeds the allowed current as dictated by the continuously monitored CP signal duty cycle then overload protection may be performed whereby the microcontroller may start flashing the error indicator 44 for at most 5 seconds before deenergizing power relays 116, 118. In the illustrated embodiment, the duration may decrease more rapidly as the load continues to increase above the allowed current, and in some instances may immediately shut off immediately if, for example, the load current exceeds 1.5× the allowed current.

Thus, if block 218 determines that the load current exceeds the allowed current, control passes to block 220 to start flashing the error indicator. Control then passes to block 222 to determine if the duration of exceeding the allowed current meets a disable threshold (which may be variable based upon the degree to which the allowed current is exceeded), and if it does, control passes to block 224 to deenergize the power relays 116, 118 and light the error indicator with a solid light.

Next, block 226 determines if removal of the EVSE plug has been detected. In particular, the microcontroller may continuously monitor the voltage at analog input AI1 to detect the pressing of switch 148 on the plug, indicating that the EVSE plug is about to be removed. In such case, control passes to block 228 to immediately deenergize power relays 116, 118 to avoid any arcing when the plug is removed. If plug removal is not detected in block 226, or after deenergizing the power relays in block 228, control passes to block 230 to wait for a next processing interval, whereby control then returns to block 204 to perform another iteration of the loop.

It will be appreciated that implementation of the various operations disclosed in FIG. 5, as well as implementation of the control circuit of FIG. 3, would be well within the abilities of those of ordinary skill having the benefit of the instant disclosure. Moreover, it will be appreciated that, while certain features may be discussed herein in connection with certain embodiments and/or in connection with certain figures, unless expressly stated to the contrary, such features generally may be incorporated into any of the embodiments discussed and illustrated herein. Moreover, features that are disclosed as being combined in some embodiments may generally be implemented separately in other embodiments, and features that are disclosed as being implemented separately in some embodiments may be combined in other embodiments, so the fact that a particular feature is discussed in the context of one embodiment but not another should not be construed as an admission that those two embodiments are mutually exclusive of one another. Various additional modifications may be made to the illustrated embodiments consistent with the invention. Therefore, the invention lies in the claims hereinafter appended.

What is claimed is:

1. An apparatus configured to receive power from an Electric Vehicle Supply Equipment (EVSE) device that operates in at least disconnected, connected but not charging, and charging states and that includes a plug that is configured to supply power to an electric vehicle when the EVSE device is in the charging state, the apparatus comprising:
a housing;
an input power receptacle disposed on the housing and configured to receive the plug of the EVSE device to establish a physical connection therebetween when the EVSE device is in the disconnected state, the input power receptacle including one or more line power inputs configured to interface with one or more corresponding line power outputs of the plug of the EVSE device;
a control circuit coupled to the input power receptacle and configured to, upon establishment of the physical connection between the plug and the input power receptacle, automatically cause the EVSE device to transition from the disconnected state to the connected but not charging state; and
a user-actuatable control coupled to the control circuit, wherein the user-actuatable control is a physical momentary control;
wherein the control circuit is further configured to, in response to user actuation of the user-actuatable control when the physical connection between the plug and the input power receptacle is established and the EVSE device is in the connected but not charging state, cause the EVSE device to transition from the connected but not charging state to the charging state and thereby supply power to the one or more line power inputs of the input power receptacle through the plug.

2. The apparatus of claim 1, further comprising one or more power output receptacles coupled to the one or more line power inputs of the input power receptacle, each of the one or more output power receptacles configured to receive a plug from an external electrically-powered device such that when the EVSE device is in the charging state and the physical connection is established between the plug and the input. power receptacle, the power supplied to the one or more line power inputs of the input power receptacle through the plug powers the one or more output power receptacles.

3. The apparatus of claim 2, wherein the one or more output power receptacles includes a plurality of output power receptacles capable of simultaneously powering a plurality of external electrically-powered devices having respective plugs coupled to the plurality of output power receptacles.

4. The apparatus of claim 3, wherein the plurality of output power receptacles differ from one another such that each of the plurality of output power receptacles receives a different type of plug.

5. The apparatus of claim 4, wherein the plurality of output power receptacles includes a 15 Amp National Electrical Manufacturers Association (NEMA) compatible receptacle, a 20 Amp NEMA compatible receptacle, a 30 Amp NEMA compatible receptacle, and a 50 Amp NEMA compatible receptacle.

6. The apparatus of claim 1, further comprising one or more electrical loads disposed in the housing and coupled to the one or more line power inputs of the input power receptacle such that when the EVSE device is in the charging state and the physical connection is established between the plug and the input power receptacle, the power supplied to the one or more line power inputs of the input power receptacle through the plug powers the one or more electrical loads.

7. The apparatus of claim 6, wherein the one or more electrical loads includes an electric motor and/or a heating element.

8. The apparatus of claim 6, wherein the apparatus is an appliance or a tool.

9. The apparatus of claim 8, wherein the apparatus is a vacuum, a power tool, a heater, or an air conditioner.

10. The apparatus of claim 1, wherein the input power receptacle is a Society of Automotive Engineers (SAE) J1772 compatible receptacle.

11. The apparatus of claim 1, wherein the input power receptacle includes a control input configured to interface with a corresponding control output of the plug, wherein the control circuit causes the EVSE device to transition from the disconnected state to the connected but not charging state by reducing a voltage at the control output of the plug below a first threshold, and wherein the control circuit causes the EVSE device to transition from the connected but not charging state to the charging state by reducing the voltage at the control output of the plug below a second threshold that is lower than the first threshold.

12. The apparatus of claim 11, wherein the control circuit includes first and second resistors coupled to the control input of the input power receptacle, the first resistor configured to electrically couple the control output of the plug to ground through the first resistor when the physical connection between the plug and the input power receptacle is established, and the second resistor configured to electrically couple the control output of the plug to ground through the second resistor when the user-actuatable control is actuated.

13. The apparatus of claim 1, wherein the control circuit includes a controller and a power supply that powers the controller, and wherein the power supply is coupled to the one or more line power inputs of the input power receptacle such that the power supply and controller are unpowered until the physical connection between the plug and the input power receptacle is established and the EVSE device is transitioned from the connected but not charging state to the charging state in response to the user actuation of the user-actuatable control.

14. The apparatus of claim 1, wherein the user-actuatable control is a first user-actuatable control, the apparatus further comprising:
one or more line power outputs configured to power one or more electrical loads;
one or more relays, each configured to selectively couple a respective line power input of the one or more line power inputs and to a respective line power output of the one or more line power outputs in response to a respective relay control signal; and
a second user-actuatable control coupled to the control circuit;
wherein the control circuit is configured to drive the respective relay control signal of each of the one or more relays to selectively couple together the respective line power input and line power output of each of the one or more relays and thereby selectively power the one or more electrical loads.

15. The apparatus of claim 14, wherein the first and second user-actuatable controls are physical momentary controls disposed on the housing.

16. The apparatus of claim 14, wherein the control circuit is further configured to disable the one or more relays in response to detecting removal of the plug from the input power receptacle.

17. The apparatus of claim 14, wherein the input power receptacle includes a control input configured to interface with a corresponding control output of the plug, wherein the control circuit is further configured to determine an allowed current for supplying power over the one or more line power outputs by sensing a control signal generated by the EVSE device and received by the control input of the input power receptacle.

18. The apparatus of claim 17, wherein the control circuit is configured to determine the allowed current for supplying power over the one or more line power outputs by determining a duty cycle of the control signal.

19. The apparatus of claim 17, wherein the control circuit is further configured to sense a load current while power is supplied over the one or more line power outputs and compare the sensed load current with the determined allowed current.

20. The apparatus of claim 19, wherein the control circuit is configured to selectively generate an alert in response to the comparison of the sensed load current with the determined allowed current and/or selectively decouple the respective line power input and line power output of each of the one or more relays from one another to discontinue powering the one or more electrical loads.

21. The apparatus of claim 17, wherein the control circuit is further configured to shut down in response to a failure to determine the allowed current for supplying power over the one or more line power outputs.

22. An apparatus configured to receive power from an Electric Vehicle Supply Equipment (EVSE) device that operates in at least disconnected, connected but not charging, and charging states and that includes a plug that is configured to supply power to an electric vehicle when the EVSE device is in the charging state, the apparatus comprising:
a housing;
one or more electrical loads disposed in the housing, the one or more electrical loads including one or more electric motors and/or one or more heating elements;
an input power receptacle disposed on the housing and configured to receive the plug of the EVSE device to establish a physical connection therebetween when the EVSE device is in the disconnected state, the input power receptacle including one or more line power inputs configured to receive power from the plug of the EVSE device;
a control circuit coupled to the input power receptacle and configured to, upon establishment of the physical connection between the plug and the input power receptacle, automatically cause the EVSE device to transition from the disconnected state to the connected but not charging state; and
a user-actuatable control coupled to the control circuit;
wherein the control circuit is further configured to, in response to user actuation of the user-actuatable control when the physical connection between the plug and the input power receptacle is established and the EVSE device is in the connected but not charging state, cause the EVSE device to transition from the connected but not charging state to the charging state and thereby supply power to the one or more line power inputs of the input power receptacle through the plug.

* * * * *